United States Patent [19]

Soriente et al.

[11] Patent Number: 4,863,498
[45] Date of Patent: Sep. 5, 1989

[54] DEAERATOR UNIT

[75] Inventors: Alfonse J. Soriente, Westfield, N.J.; Jay C. Crosman, New Rochelle, N.Y.; Sam Frisch, Wall Township; Eli Salem, Deal, both of N.J.

[73] Assignee: The Graver Company, Union, N.J.

[21] Appl. No.: 279,205

[22] Filed: Dec. 2, 1988

[51] Int. Cl.⁴ ............................................. B01D 47/02
[52] U.S. Cl. .................................... 55/198; 55/309
[58] Field of Search .................................. 55/198, 309

[56] References Cited

U.S. PATENT DOCUMENTS 4,445,537  5/1984  Athey et al. ............................ 55/39
4,698,076  10/1987  Bekedam ................................ 55/196

FOREIGN PATENT DOCUMENTS 1305495  4/1987  U.S.S.R. ................................. 55/198

Primary Examiner—Bernard Nozick
Attorney, Agent, or Firm—Dressler, Goldsmith, Shore, Sutker & Milnamow, Ltd.

[57] ABSTRACT

A deaerator device for separating non-condensable gases from condensate. The device includes an upper deaerator stage means comprising a spray nozzle assembly which directs liquid particles under high velocity into a hood located thereabove. In the hood, the particles are raised to their saturation temperature by steam introduced into the device wherein the non-condensable gases are liberated from the condensate and vented to the atmosphere. Located below the nozzles is tray for receiving the condensed water. The tray has a plurality of openings which directs condensate into a lower deaerator stage consisting of a packing which removes substantially all of the non-condensable gases left in the condensate.

6 Claims, 1 Drawing Sheet

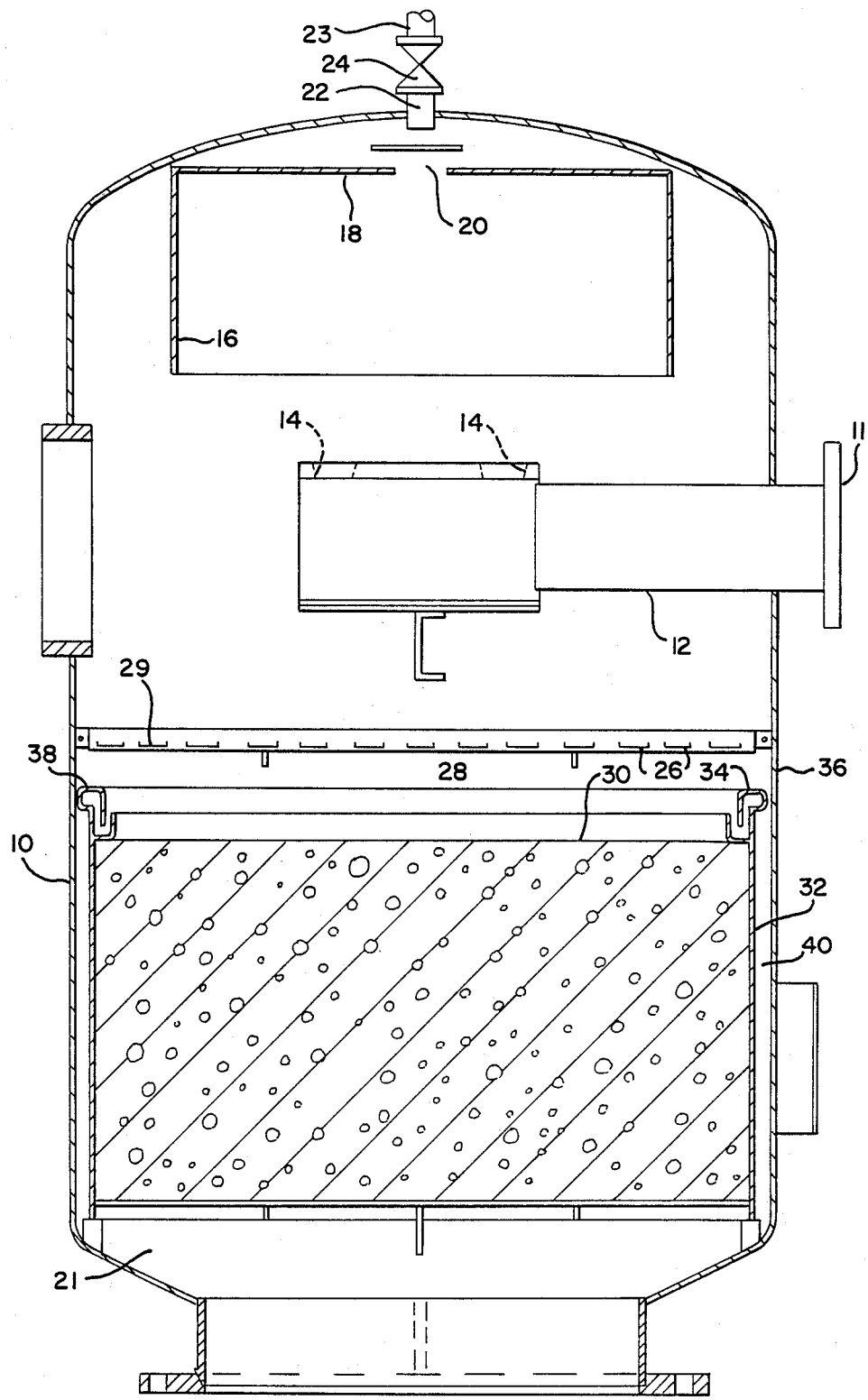

DEAERATOR UNIT

This invention relates to a deaeration system for deaerating boiler feed water, and the like. In the continuous operation of a boiler, it is necessary to deaerate the boiler feed water, which is comprised of steam condensate and makeup water. Oxygen in feed water delivered to a boiler can cause corrosion and tube failure. In addition to oxygen, carbon dioxide, which is corrosive under high temperatures, must be continuously removed, as it is not only present in makeup water, but is produced by the breakdown of bicarbonates in the boiler water.

There have been various types of deaerators employed in the marketplace, and it is desirable to have a deaerator with improved efficiency, thus being able to lower the cost to the operator. In the conventional deaerator, no significant attempt has been made to increase the contact time between gas and liquid without making the tank larger, and also increasing the depth of trays and packing employed.

In accordance with the present invention, there is provided a system whereby the contact time between the gas and liquid is increased without increasing tank size. This is accomplished by recirculating the liquid under a hood into which the liquid is sprayed. The changed direction of flow by employing such a system also acts to reduce the water flow velocity. Essentially, by employing applicants' invention, the efficiency of gas removal is done at a lower cost because it increases the transfer units by intimate contact and longer retention time between gas and liquid. It is acknowledged that various deaerators currently on the market use several of the independent features referred to hereinafter as forming the basis of the present invention, but there is no single system that applies a number of them in the unique and novel way that applicants do.

Essentially, the novel deaerator disclosed herein includes a spray valve assembly which takes make-up water and condensate from a boiler normally at a temperature below 180° F. into an inlet of the deaerator unit and directs the condensate through spray valves in a spray pattern up against the walls of a hood located directly above the spray valves. The condensate includes non-condensable gases, such as, oxygen and carbon dioxide, which must be removed from the makeup water and the boiler water. Introduced into the bottom of the deaerator is steam which is used to bring the water to its saturation temperature, or slightly below the boiling point, at which temperature the solubility of such gases as oxygen and carbon dioxide in the water approaches zero. With the water raised to this temperature, the non-condensable gases are liberated and are swept out the vent of the deaerating tank. In the area under the hood, the steam is condensed and falls into a perforated pan located beneath the condensate inlet, which pan extends substantially across the full width of the deaerator and thus acts to distribute the substantially deaerated water across the width of the deaerator. The water flowing from the pan flows downwardly through packing located below the pan wherein substantially all of the non-condensable gases remaining in the water are removed from the water. The water is then returned to the boiler. The water temperature and water and steam pressures and distance of the spray valves from the hood are set to provide maximum efficiency.

It is particularly important to note that the fine spray of water located in the hood provides a dynamic barrier to the open vent causing the escaping steam to condense, but allowing the non-condensable gases to pass.

While this general type of deaeration has been employed before, applicants' novel system is designed to force the steam to pass through sheets of water formed by the spray valves, and in addition to pass through an area where due to the spray pattern and its velocity and the design of the hood there is imparted a rigorous scrubbing action which intimately mixes the water and scrubs out the gases, which further acts to separate the non-condensable gases from the condensate. The particular configuration of the hood in combination with the spray pattern from the spray valve results in the liquid to be deaerated remaining under the hood for a longer period of time by virtue of the velocity of the spray and the design of the hood which confines the water in suspension thus increasing the contact time between the liquid and the steam.

The tray located below the water inlet collects the condensate flowing downwardly from the hood. The tray reduces the falling velocity of the water to zero, thus increasing its contact time with the steam. The tray uniformly distributes the water across the packing to increase the efficiency of the packing in removing any remaining non-condensable gases in the water flowing therethrough. The packing is surrounded by an unrestricted annular chamber through which steam can flow during periods of high steam flow rate in an upward direction through the deaerator. Surrounding the packing is an annular seal which is sealed along its inner periphery relative to the packing and seals off the annular chamber located around the packing during periods of low flow.

Other objects and advantages will be apparent from the single FIGURE and the description of the novel deaerator shown therein.

The deaerator includes a housing 10 into which condensate and makeup water flow through a pipe 12 leading from a water inlet 11. The water inlet ends substantially in the center of the deaerator and has located therein a plurality of spray valves 14. The spray valves are conventional and are designed to emit a pattern of water particles into a generally cylindrical spray hood 16 having a substantially closed top 18 that is secured in a conventional manner to the deaerator walls. A type of spring-loaded valve that will accomplish the desired function consists of one incorporating a hyperbolic disc that provides a constant spray pattern under a wide variation of flow rates and over a range of pressured drops, and particularly one that has less than a 4 psi. pressure drop at maximum flow rates. The configuration of the hood 16, the location of the spray nozzles, and the spray pattern of the water flowing therefrom are designed so that sheets of water are formed under the hood and the trajectory of the water particles bouncing off the hood walls intermix, resulting in a rigorous srubbing action which intimately mixes the water and scrubs out the non-condensable gases. This increased residence time of the water in the hood results in a higher percentage of non-condensable gases being removed from the water than a deaerator tank of equal size. The water entering the deaerator is kept away from the walls of the deaerator, thus minimizing the deleterious effect the oxygen and carbon dioxide can have on the walls thereof.

Located intermediate the top of the hood is an opening 20 which is provided to vent the non-condensable gases that are released from the water particles directed into the spray hood 16 through the valves 14. As is well known in the art, non-condensable gases, such as, oxygen and carbon dioxide, are liberated from the water by heating the water almost to its saturation temperature. The temperature of the water is raised to approximately 211° F., at which time the solubility of such gases in the water particles located under the hood approaches zero.

To accomplish the heating of the water particles, steam under pressure is introduced through the opening 21 at the bottom of the deaerator. The steam normally flows up through the packing 30 and into the chamber 16, where it heats the particles to its saturation temperature to release the oxygen and carbon dioxide therefrom. When the oxygen and carbon dioxide gases are released, they are vented out through the opening 20. The opening 20 is partially covered by a plate 22 suitably secured to hood top wall 18 that directs the liberated gases around the plate and out through the outlet to atmosphere. A control valve 24 is located in the outlet pipe to control the flow therethrough by throttling and controlling the differential steam pressure, if desired to compensate for changes in pressure in the tank.

It is possible, of course, that a small amount of steam will vent out of the opening 20 with the non-condensable gases. Essentially, the steam located in the spray hood condenses as water essentially free of oxygen and carbon dioxide and drops by gravity onto a tray 26 located below the tube 12 and spray nozzles 14. The tray 26 extends across the width of the deaerator and has a large number of spaced holes 28 in the bottom which have raised edges 29 to provide some residence time of the water in the tray. The water leaving the tray 26 is uniformly distributed across the tray and thus will be uniformly distributed through packing 30 located in a basket 32 in the bottom of the deaerator. Packing 30 serves to remove most of the remaining non-condensable gases in the water as the water passes therethrough.

Surrounding the packing is an annular seal 34 which is welded at a plurality of places to the packing basket 32. The seal 34 is designed to fit closely adjacent the inner wall 36 of the deaerator 10. There is a water seal provided between the annular seal 34 and the packing 30. The annular seal lip 38 is resilient and normally will prevent the flow of steam from bypassing the packing in the basket 32. If there is a particularly high steam flow rate which does not pass through the packing 30, the steam under pressure will flow up through the annular chamber 40 to deflect the seal 38 and admit steam into the deaerator chamber above the packing.

It is intended to cover by the following claims all modification and embodiments that are encompassed therein.

What is claimed is:

1. A deaerator device for separating out dissolved gases from a liquid, comprising: a deaerating vessel having first deaerating stage means disposed within an upper chamber thereof and second deaerating stage means disposed within a lower chamber thereof; distribution means dividing said vessel into upper and lower chambers and generally uniformly directing deaerated liquid from said first deaerating stage means to said second deaerating stage means; said first deaerating stage means including a spray hood secured to an upper portion of said upper chamber and an inlet pipe extending into an intermediate position of said upper chamber for directing said liquid thereinto; spray nozzle means positioned below said spray hood in communication with said inlet pipe for directing fluid upwardly into said spray hood; said second deaerating stage means including mass transfer packing media supported within said lower chamber; means for directing steam into said lower chamber upwardly through said mass transfer packing media and into said upper chamber, which steam raises the temperature of said liquid to be deaerated to its saturation level, whereby the non-condensable gases therein are liberated from the liquid being deaerated; and vent means for venting non-condensable gases from under said hood and out of said deaerator.

2. A deaerator device as set forth in claim 1 in which the spray hood has a downwardly extending peripheral wall, a substantially closed upper end and a substantially open lower end, and said vent means includes an opening located in the central portion of the closed upper end of the hood for venting non-condensable gases.

3. A deaerator as set forth in claim 2 in which the venting means for the deaerator further includes an outlet pipe secured to the upper portion of the vessel and a valve means located therein for controlling the flow therethrough.

4. A deaerator as set forth in claim 2 in which the spray nozzle means positioned below said spray hood is constructed to direct a nozzle spray into said hood at a high velocity, which spray pattern results in a rigorous scrubbing action, which intimately mixes the water and scrubs out non-condensable gases.

5. A deaerator as set forth in claim 4 in which the distribution means consists of a horizontal tray extending substantially across the width of said deaerator which tray defines a plurality of raised edges to provide a residence time for said water flowing thereinto from under said hood.

6. A deaerator as set forth in claim 5 in which there is an annular chamber surrounding said packing means and an annular resilient valve means is provided to prevent the flow of steam through said annular chamber during low steam flow rates and to permit steam to flow therethrough during high steam flow rates.

* * * * *